(12) United States Patent
Sun et al.

(10) Patent No.: US 9,893,508 B2
(45) Date of Patent: Feb. 13, 2018

(54) STEP-DOWN CIRCUIT

(71) Applicant: Johnson Electric S.A., Murten (CH)

(72) Inventors: Chi Ping Sun, Hong Kong (CN); Hai Bo Jiang, Shenzhen (CN); Qiu Bao Wang, Hong Kong (CN); Yun Long Jiang, Shenzhen (CN); Yan Yun Cui, Shenzhen (CN)

(73) Assignee: Johnson Electric S.A., Murten (CH)

( * ) Notice: Subject to any disclaimer, the term of this patent is extended or adjusted under 35 U.S.C. 154(b) by 272 days.

(21) Appl. No.: 14/805,040

(22) Filed: Jul. 21, 2015

(65) Prior Publication Data

US 2016/0028220 A1    Jan. 28, 2016

(30) Foreign Application Priority Data

Jul. 22, 2014  (CN) .......................... 2014 1 0351550

(51) Int. Cl.
*H02H 3/08* (2006.01)
*H02H 3/087* (2006.01)
*H02H 3/20* (2006.01)

(52) U.S. Cl.
CPC .............. *H02H 3/08* (2013.01); *H02H 3/087* (2013.01); *H02H 3/202* (2013.01)

(58) Field of Classification Search
CPC ........... H02H 3/08; H02H 3/087; H02H 3/202

USPC ........................................................... 361/87
See application file for complete search history.

(56) References Cited

U.S. PATENT DOCUMENTS

2005/0206323 A1* 9/2005 Hayakawa ............ H02M 3/158
                                                    315/209 R
2015/0146328 A1* 5/2015 Mikami ............... H02H 7/1213
                                                    361/18

FOREIGN PATENT DOCUMENTS

JP          9-51672 A     2/1997
JP          2006-141124 A  6/2006

* cited by examiner

*Primary Examiner* — Thienvu Tran
*Assistant Examiner* — Kevin J Comber
(74) *Attorney, Agent, or Firm* — Muncy, Geissler, Olds & Lowe, P.C.

(57) ABSTRACT

A step-down circuit has a switch connected in series between a direct current power supply and a load. A switch control circuit is configured to turn the switch off when the voltage across the load is higher than a predetermined first threshold and turn the switch on when the voltage across the load is lower than the first threshold. An energy storage unit is charged by the power supply when the switch is on and supply power to the load when the switch is off. An overcurrent protection circuit turns the switch off when the input current of the switch is higher than a predetermined second threshold.

8 Claims, 2 Drawing Sheets

STEP-DOWN CIRCUIT

CROSS REFERENCE TO RELATED APPLICATIONS

This non-provisional patent application claims priority under 35 U.S.C. § 119(a) from Patent Application No. 201410351550.8 filed in The People's Republic of China on Jul. 22, 2014, the entire contents of which are hereby incorporated by reference.

FIELD OF THE INVENTION

This invention relates to a direct current step-down circuit and in particular, to a step-down circuit used as a drive circuit of a brushless direct current motor.

BACKGROUND OF THE INVENTION

A traditional direct current step-down converting circuit which employs resistors connected in series has same load current (output current) and input current. The conversion efficiency of this converting circuit is usually less than 50% (the conversion efficiency is equal to the ratio of an output voltage×output current (Vout.Iout) to an input voltage×input current (Vin.Iin)). In some cases the conversion efficiency is as low as 30%. Moreover, a large amount of heat is produced due to extremely high loss rate of electric energy, therefore a heat sink or cooling system is usually configured for heat dissipation.

Therefore, an improvement solution is desired.

SUMMARY OF THE INVENTION

Hence there is a desire for an improved direct current step-down circuit.

Accordingly, in one aspect thereof, the present invention provides a step-down circuit, comprising: a switch connected between a direct current power supply and a load; a switch control circuit configured to turn the switch off when the voltage across the load is higher than a predetermined first threshold and turn the switch on when the voltage across the load is lower than the first threshold; an energy storage unit configured to be charged by the direct current power supply when the switch is turned on and supply power to the load when the switch is turned off; and an overcurrent protection circuit configured to turn the switch off when the input current of the switch is higher than a predetermined second threshold and allow the switch to be controlled by the switch control circuit when the input current is lower than the second threshold.

Preferably, the overcurrent protection circuit comprises a first comparator, a first input of the first comparator being connected to a first reference voltage, a second input of the first comparator being connected to a first voltage detection signal corresponding to the input current, and an output of the first comparator outputting a control signal to a control terminal of the switch.

Preferably, the switch control circuit comprises a second comparator, a first input of the second comparator being connected to a second reference voltage, a second input of the second comparator being connected to a second voltage detection signal corresponding to the voltage across the load, and an output of the second comparator outputting a control signal to the control terminal of the switch.

Preferably, the switch is turned on when the control terminal of the switch is at a low level voltage and the switch is turned off when the control terminal of the switch is at a high level voltage; the first input of the first comparator is an in-phase input, the second input of the first comparator is an inverting input connected to one end of a sampling resistor connected between the direct current power supply and the switch, and the output terminal of the first comparator outputs a control signal to the control terminal of the switch through a first one-way diode; when the voltage detection signal of the inverting input of the first comparator is higher than the first reference voltage, the first one-way diode is turned off and the switch is controlled by the switch control circuit, and when the voltage detection signal of the inverting input of the first comparator is lower than the first reference voltage, the first one-way diode is turned on, and the control signal outputted by the output of the first comparator turns the switch off.

Preferably, the step-down circuit further comprises a shunting sub-circuit connected in parallel with the load, the shunting sub-circuit comprising a first resistor connected to a second resistor, the inverting input of the second comparator is connected to the second reference voltage, and the in-phase input of the second comparator is connected to a node between the first resistor and the second resistor.

Preferably, the output of the first comparator is connected to the anode of the first one-way diode, and the cathode of the first one-way diode is connected to the in-phase input of the second comparator.

Preferably, the in-phase input of the second comparator is connected to the output of the second comparator through a third resistor.

Preferably, the energy storage unit comprises a capacitor connected in parallel with the load, and the step-down circuit further comprises an inductor and a second one-way diode, the inductor being connected in series between an output terminal of the switch and the anode of the capacitor, the cathode of the second one-way diode being connected to the output terminal of the switch, and the anode of the second one-way diode being connected to the cathode of the capacitor.

Preferably, the switch is a PNP transistor having a base, emitter and collector, and the emitter of the transistor is connected to the direct current power supply through a sampling resistor, the collector of the transistor serves as an output terminal, and the base of the transistor is connected to the output of the second comparator through a fourth resistor.

Preferably, the base of the PNP transistor is connected to the direct current power supply through a fifth resistor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
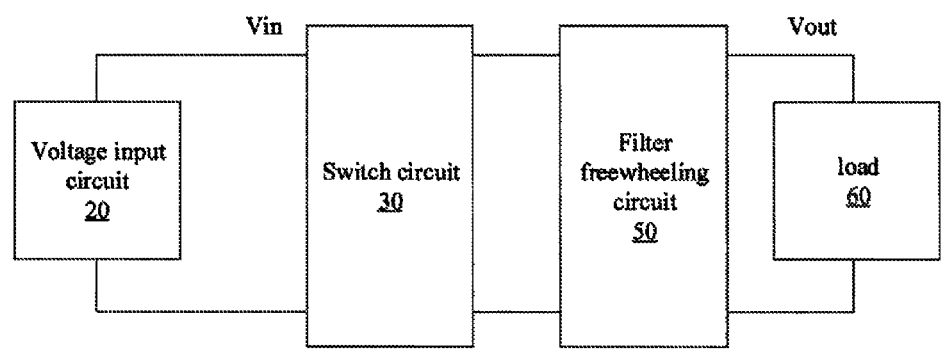
FIG. 1 is a block diagram of a direct current step-down circuit provided by the invention.
Figure 2:
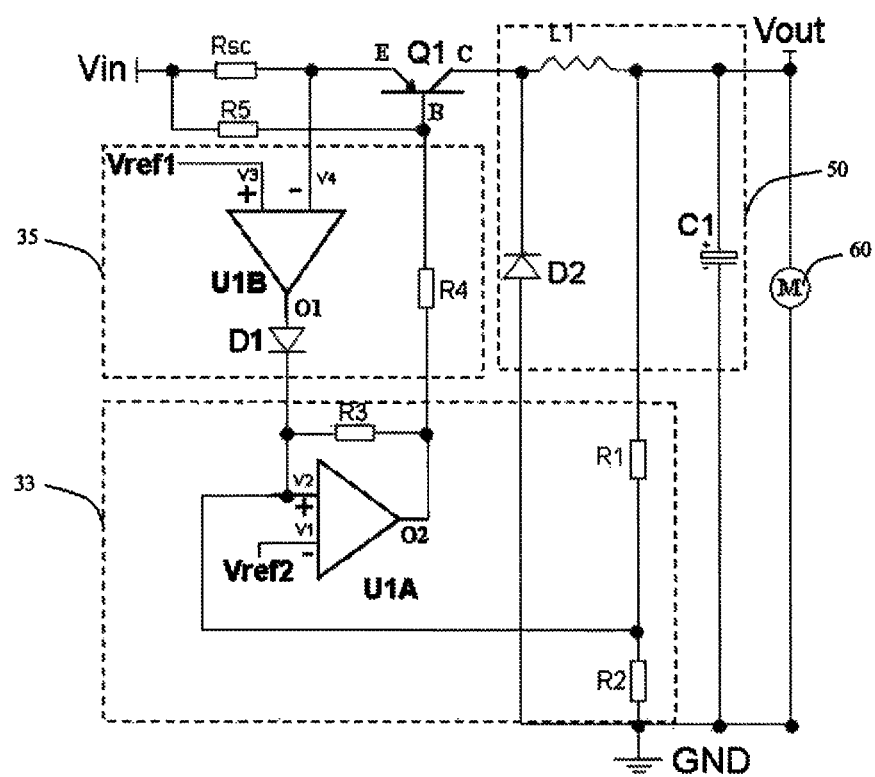
FIG. 2 is a circuit diagram of the direct current step-down circuit shown in FIG. 1.

As shown in FIG. 1, the step-down circuit according to one embodiment of the present invention is connected between a voltage input circuit 20 and a load 60. The step-down circuit comprises a switch circuit 30 connected to the voltage input circuit 20, and a filter freewheeling circuit 50 connected between the switch circuit 30 and the load 60. The voltage input circuit 20 could be a constant voltage DC power supply or other constant voltage output circuit. The switch circuit 30 switches on and switches off the power supply. The switch circuit 30 and the filter freewheeling circuit 50 convert the input voltage Vin to the desired output voltage Vout. The load 60 may be, but not limited to a brushless DC motor. The switch circuit 30 will be further described with reference to FIG. 2.

The output voltage of the voltage input circuit 20 (i.e., the input voltage Vin of the switch circuit 30), for example, may be 15V. The voltage Vout across the load 60, for example may be 5V. A shunting sub-circuit comprises two resistors (R1 and R2) connected in series, in the form of a voltage divider, is connected in parallel to the load 60. A capacitor C1 connected in parallel to the load 60 is provided in the filter freewheeling circuit 50 and serves as an energy storage unit. The switch circuit 30 includes a switch Q1, a switch control circuit 33 and an overcurrent protection circuit 35. The switch control circuit 33 is configured to turn the switch Q1 off when the voltage across the load 60 is higher than a predetermined first threshold and to turn the switch Q1 on when the voltage across the load is lower than the first threshold. The capacitor C1 is charged by the voltage Vin through an inductor L1 when the switch Q1 is turned on. When the switch Q1 is turned off, the capacitor C1 discharges to supply power to the load 60. The overcurrent protection circuit 35 is configured to turn the switch Q1 off when the input current Iin of the switch Q1 is higher than a predetermined second threshold. The switch Q1 is controlled by the switch control circuit 33 when the input current Iin is lower than the second threshold.

In the embodiment, the switch Q1 is preferably a PNP transistor and is configured to switch the circuit between the voltage input circuit 20 and the load 60 on and off. The filter freewheeling circuit 50 includes the inductor L1, the capacitor C1 and a one-way diode D2. The capacitor C1 is connected in parallel with the load 60. The cathode of the capacitor C1 is grounded. The emitter E of the transistor Q1 is connected to the input voltage Vin through a sampling resistor Rsc. The inductor L1 is connected between the collector C of the transistor Q1 and the anode of the capacitor C1. The cathode of the one-way diode D2 is connected to the collector C of the transistor Q1. The anode of the one-way diode D2 is connected to the cathode of the capacitor C1.

The switch control circuit 33 includes a comparator U1A. The in-phase input terminal V2 of the comparator U1A is connected to the node point between the resistor R1 and the resistor R2 of the shunting sub-circuit. The inverting input terminal V1 of the comparator U1A is connected to a reference voltage Vref2. The output terminal O2 of the comparator U1A is connected to the base B of the switch transistor Q1 through a resistor R4. The output terminal O2 of the comparator U1A is further connected to the in-phase input terminal V2 of the comparator U1A through a resistor R3 to provide positive feedback and generate hysteresis effect. A resistor R5 is also connected in series between the base B of the switch transistor Q1 and the input voltage Vin.

In an initial state, the switch transistor Q1 is turned off, the input current Iin is 0A, and the output voltage Vout is 0V. An output feedback voltage detected at the in-phase input terminal V2 of the comparator U1A is also 0V (V2=Vout*R2/(R1+R2)). At this moment, the voltage of the in-phase input terminal V2 is less than the input voltage (i.e., reference voltage Vref2) of the inverting input terminal V1, and the output terminal O2 of the comparator U1A outputs a low level to turn on the switch transistor Q1, thus connecting the input voltage Vin to the inductor L1 to supply power to the load 60 and charge the capacitor C1. During this process, both the output voltage Vout and the output feedback voltage detected at the in-phase input terminal V2 of the comparator U1A are gradually increased.

When the output feedback voltage detected at the in-phase input terminal V2 of the comparator U1A is greater than the reference voltage Vref2, the output terminal O2 of the comparator U1A outputs a high level to turn off the switch transistor Q1. A flywheeling current is produced by the inductor L1. The flywheeling current passes through the load 60 and the diode D2. The capacitor C1 is discharged to supply power to the load 60. With the continuous discharging of the capacitor C1, the output voltage Vout drops slowly. Therefore, the voltage detected at the in-phase input terminal V2 of the comparator U1A also decreases gradually. When the voltage detected at the input terminal V2 is less than the reference voltage Vref2, the output terminal O2 of the comparator U1A outputs a low level to turn the switch transistor Q1 on again so that the power supply Vin supplies power to the load 60 and recharges the capacitor C1.

In this manner, under the control of the comparator U1A, the switch transistor Q1 is periodically turned on and off to convert the input voltage Vin (say 15V) to the expected output voltage Vout (at say 5V) under the effect of the freewheeling circuit 50.

The overcurrent protection circuit 35 includes a comparator U1B. The in-phase input terminal V3 of the comparator U1B is connected to a reference voltage Vref1. The inverting input terminal V4 of the comparator U1B is connected to the emitter E of the switch transistor Q1. The output terminal O1 of the comparator U1B is connected to the anode of the one-way diode D1. The cathode of the one-way diode D1 is connected to the in-phase input terminal V2 of the comparator U1A.

In an initial state, the input current Iin is 0 A, and the current conversion voltage of the inverting input terminal V4 of the comparator U1B is equal to Vin (V4=Vin−Iin*Rsc). Because Vref1 is less than Vin, the output terminal O1 of the comparator U1B outputs a low level, and the one-way diode D1 is cut off.

In the normal working state of the circuit, the input current is relatively small, and the value of the reference voltage Vref1 at the in-phase input terminal V3 of the comparator U1B is configured to be less than the current conversion voltage at the inverting input terminal V4 of the comparator U1B all the time, therefore the output terminal O1 of the comparator U1B outputs a low level, and the one-way diode D1 is cut off. In other words, the comparator U1B does not participate in the control of the switch transistor Q1 in the initial state or in the normal working state.

In case of the load 60 being shorted or otherwise an excessive current flows through the load, the voltage Vout across the load 60 reduces or becomes smaller. At this moment, the voltage V2 detected at the in-phase input terminal of the comparator U1A also becomes smaller (usually less than Vref2). Without the overcurrent protection circuit, the comparator U1A will still switch on the switch transistor Q1, which will aggravate further the short circuit situation/overcurrent situation. With the overcurrent protection circuit, with the increase in the current Iin, the voltage V4 detected at the inverting input terminal V4 of the comparator U1B is decreased. When the current Iin is increased to cause the voltage detected at the inverting input terminal V4 to be less than Vref1, the output terminal O1 of the comparator U1B outputs a high level. Because the voltage detected at the in-phase input terminal V2 of the comparator U1A is lower at this moment, the one-way diode D1 is switched on, and the high level outputted by the comparator U1B causes the switch transistor Q1 be turned off, thus cutting off the power supply to the load, providing short circuit protection and overcurrent protection.

The main energy loss of the circuit lies in the switching loss of the transistor as well as the divider resistors R1 and R2. Through rationally setting the switching frequency of the transistor as well as the R1 and R2 with larger resistance values, the loss can be further reduced. In an embodiment of the present invention, in case that the input current Iin is equal to 0.02 A, a current (output current) Iout flowing through the load 60 is 0.05 A. Therefore, the conversion efficiency of the circuit is as high as 83.3%, which is 2 to 3 times of the conversion efficiency of a traditional linear direct current conversion circuit.

When the direct current step-down circuit provided by the present invention is applied, the transistor switch is switched between on and off states, which reduces the generation of heat; therefore, the need for a heat sink or a special cooling system for the circuit may be omitted, and the modern requirements for energy conservation are satisfied. The present invention improves the efficiency, reduces the energy consumption, simplifies the circuit design, and provides overcurrent protection.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A step-down circuit, comprising:
a switch connected between a direct current power supply and a load;
a switch control circuit configured to turn the switch off when the voltage across the load is higher than a predetermined first threshold and turn the switch on when the voltage across the load is lower than the first threshold;
an energy storage unit configured to be charged by the direct current power supply when the switch is turned on and supply power to the load when the switch is turned off; and
an overcurrent protection circuit configured to turn the switch off when the input current of the switch is higher than a predetermined second threshold and allow the switch to be controlled by the switch control circuit when the input current is lower than the second threshold; wherein the overcurrent protection circuit comprises a first comparator, a first input of the first comparator being connected to a first reference voltage, a second input of the first comparator being connected to a first voltage detection signal corresponding to the input current, and an output of the first comparator outputting a control signal to a control terminal of the switch, the switch is turned on when the control terminal of the switch is at a low level voltage and the switch is turned off when the control terminal of the switch is at a high level voltage;

the first input of the first comparator is an in-phase input, the second input of the first comparator is an inverting input connected to one end of a sampling resistor connected between the direct current power supply and the switch, and the output terminal of the first comparator outputs a control signal to the control terminal of the switch through a first one-way diode, when the voltage detection signal of the inverting input of the first comparator is higher than the first reference voltage, the first one-way diode is turned off and the switch is controlled by the switch control circuit; and when the voltage detection signal of the inverting input of the first comparator is lower than the first reference voltage, the first one-way diode is turned on, and the control signal outputted by the output of the first comparator turns the switch off.

2. The step-down circuit of claim 1, wherein the switch control circuit comprises a second comparator, a first input of the second comparator being connected to a second reference voltage, a second input of the second comparator being connected to a second voltage detection signal corresponding to the voltage across the load, and an output of the second comparator outputting a control signal to the control terminal of the switch.

3. The step-down circuit of claim 1, wherein the step-down circuit further comprises a shunting sub-circuit connected in parallel with the load, the shunting sub-circuit comprising a first resistor connected to a second resistor,
the inverting input of the second comparator is connected to the second referenced voltage and the in-phase input of the second comparator is connected to a node between the first resistor and the second resistor.

4. The step-down circuit of claim 3, wherein the output of the first comparator is connected to the anode of the first one-way diode, and
the cathode of the first one-way diode is connected to the in-phase input of the second comparator.

5. The step-down circuit of claim 4, wherein the in-phase input of the second comparator is connected to the output of the second comparator through a third resistor.

6. The step-down circuit of claim 1, wherein the energy storage unit comprises a capacitor connected in parallel with the load, and
the step-down circuit further comprises an inductor and a second one-way diode, the inductor being connected in series between an output terminal of the switch and the anode of the capacitor, the cathode of the second one-way diode being connected to the output terminal of the switch, and the anode of the second one-way diode being connected to the cathode of the capacitor.

7. The step-down circuit of claim 5, wherein the switch is a PNP transistor having a base, emitter and collector, and the emitter of the transistor is connected to the direct current power supply through a sampling resistor, the collector of the transistor serves as an output terminal, and the base of the transistor is connected to the output of the second comparator through a fourth resistor.

8. The step-down circuit of claim 7, wherein the base of the PNP transistor is connected to the direct current power supply through a fifth resistor.

* * * * *